United States Patent Office 2,992,859
Patented July 18, 1961

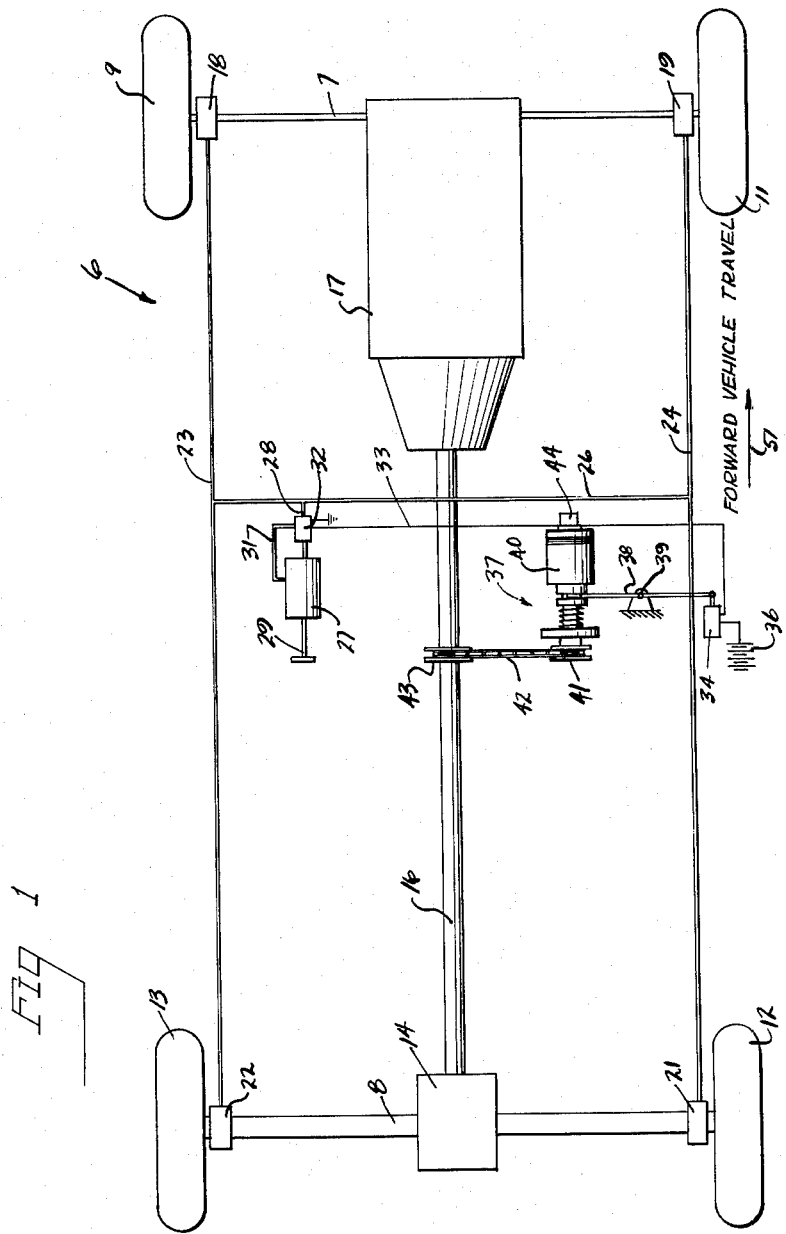

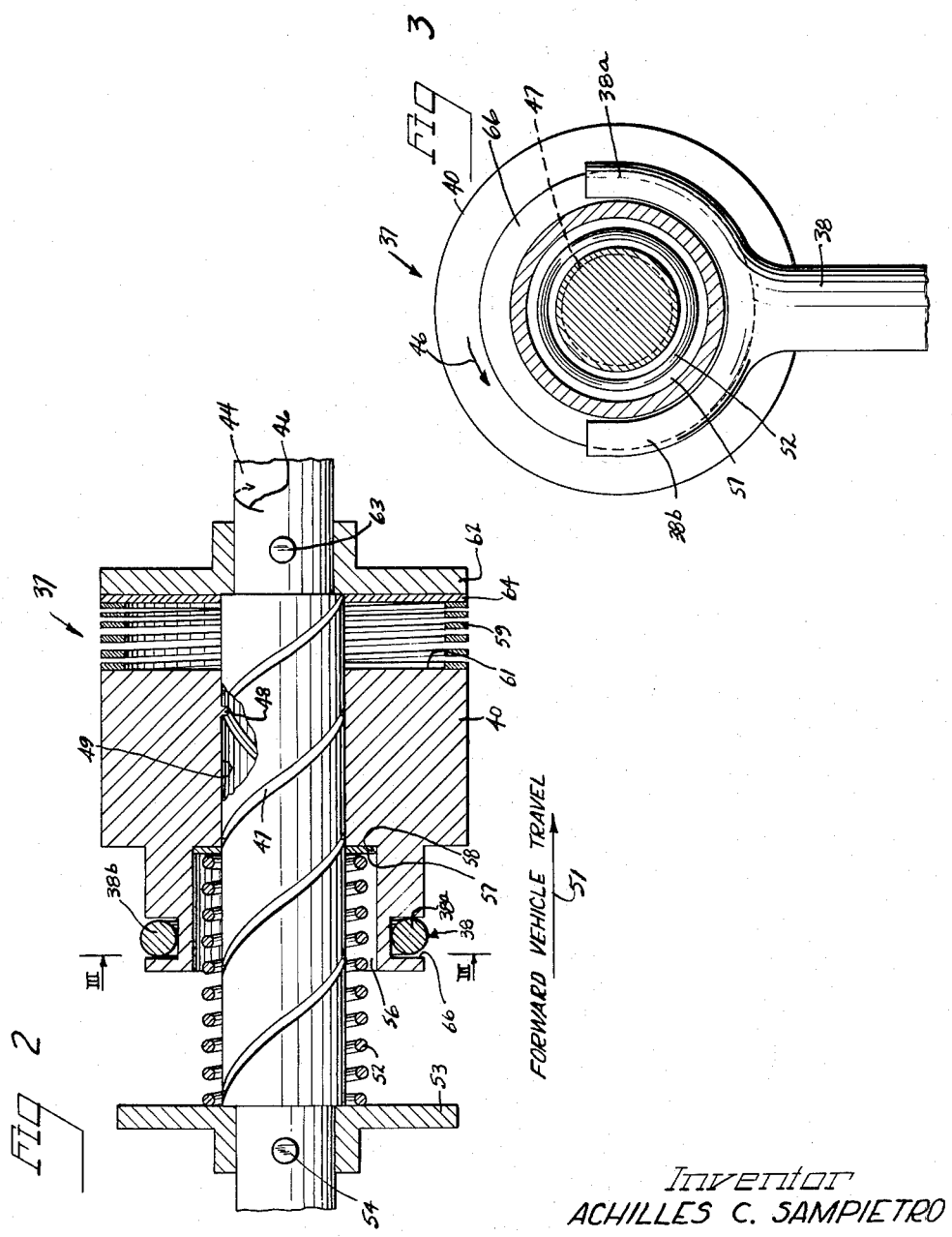

2,992,859
BRAKE CONTROL OR ANTI-SKID DEVICE
Achilles Charles Sampietro, Birmingham, Mich., assignor to Thompson Ramo Wooldridge Inc., Cleveland, Ohio, a corporation of Ohio
Filed Mar. 4, 1959, Ser. No. 797,224
7 Claims. (Cl. 303—24)

The present invention relates to improvements in braking mechanisms for vehicles and more particularly to an improved brake control which prevents the excessive application of brakes, such as will cause the wheels of the vehicle to lock and skid.

Although the principles of the present invention may be included in various road and rail vehicles, a particularly useful application is found in automobiles of the type that employ hydraulic fluid actuated brakes. In brakes used in such vehicles, there is a particular tendency for the brake system to be over-applied and lock the wheels causing them to skid. It has been recognized that a non-rotating sliding wheel is less effective in reducing the velocity of a vehicle than a wheel which is being braked to just below the sliding point. It is also recognized that the function of the vehicle is impaired and a dangerous condition exists when skidding or sliding of the wheels occur. Furthermore, the steering control of a vehicle is impaired when the wheels are locked. Thus, the maximum effectiveness in braking, safety, and steering are obtained when the braking effort does not lock the wheels, and a rotating wheel can exert a greater braking force and maintain better frictional contact with the road than can a locked wheel. A wheel which continues to turn has a directional sense, and is capable of resisting side thrusts, thus being capable of resisting being pushed sideways, and resisting dangerous skidding and loss of directional control.

When an operator exerts a braking effort, the linear deceleration of the vehicle and the angular deceleration of the wheels remain proportional until the wheels are locked. At this point, the angular deceleration of the wheels ceases to be proportional and decreases to zero.

The present invention contemplates the provision of an anti-skid or brake control device which avoids the application of an excessive braking effort which causes the angular wheel deceleration to remain proportional to vehicle deceleration.

An object of the present invention is to provide an improved control mechanism for a braking system in a wheeled vehicle which operates to compare the linear deceleration of the vehicle with the angular deceleration of selected wheels and to automatically reduce the braking effort when the ratio of angular deceleration to the linear deceleration exceeds a predetermined value.

Another object of the invention is to provide an improved mechanism for automatically controlling the application of braking force to a vehicle so as to substantially prevent an excessive application of braking force which would cause the wheels of the vehicle to skid.

Another and important object of the invention is to provide a brake control mechanism wherein a single accelerometer is employed capable of sensing both linear and angular deceleration, and which controls the force applied by the braking mechanism to a plurality of wheels.

Another object of the invention is to provide an improved and simplified mechanism for measuring the angular deceleration of wheels of a vehicle being braked.

A still further object of the invention is to provide an improved mechanism for measuring and automatically comparing linear and angular deceleration, and for providing an actuation signal when angular deceleration exceeds a predetermined quantity relative to linear deceleration.

Other objects and advantages will become more apparent with the teaching of the principles of the invention in connection with the disclosure of the preferred embodiment thereof in the specification, claims and drawings, in which:

FIGURE 1 is a plan view shown in somewhat schematic form of a controlled braking system for a vehicle embodying the principles of the present invention;

FIGURE 2 is a detailed sectional view illustrating the structure of a mechanism embodying the principles of the present invention and operative to measure and compare rotational and linear deceleration; and, FIGURE 3 is a sectional view taken along line III—III of FIGURE 2.

As shown on the drawings:

In FIGURE 1, a vehicle is illustrated at 6 in schematic form, and is an automobile or a similar vehicle. The vehicle is provided with a front axle 7 and a rear axle 8 with front wheels 9 and 11 attached at the ends of the front axle and rear wheels 12 and 13 at the end of the rear axle.

The vehicle is propelled by driving the rear wheels through a differential gearing 14 which is connected to the wheels through shafts in the rear axle. The rear axle may take the form of a housing in the usual automotive type of drive with the axle shafts enclosed, as will be appreciated by those skilled in the art. The power is delivered to the rear wheels through differential gearing within the differential housing 14 by a propeller or drive shaft 16 which is connected to the engine 17. The usual fluid drive mechanism or clutch and the usual universal joint (not shown) will be provided for the transmission of power from the engine through the drive shaft 16.

Each of the individual wheels is individually braked with brakes 18 and 19 provided for the front wheels 9 and 11 and brakes 21 and 22 provided for the rear wheels. The brakes are illustrated as hydraulically actuated and supplied with hydraulic actuating fluid through lines 23 and 24 which are interconnected by cross lines 26 so that hydraulic fluid of uniform pressure is simultaneously applied to all of the brakes.

The braking effort is applied manually by a master hydraulic cylinder 27 which is connected by a line 28 to the hydraulic fluid conduit 26. The master cylinder is provided with a piston actuated by a foot pedal 29.

To control the braking pressure applied to the individual wheels, the pressure in the hydraulic fluid line is controllably released. This is performed by the provision of a by-pass line 31 which is connected to a by-pass valve 32 in the line 28. When the pressure is to be relieved, the fluid delivered from the hydraulic master cylinder 27 is by-passed back to the cylinder by the two-way valve 32.

The valve 32 may be electrically or mechanically actuated and is illustrated as being an electrical valve connected to an electrical circuit 33 which is electrically energized by a control switch 34. Electrical energy is received from a battery 36 or the like, which may be the battery of the motor vehicle.

The switch 34 is actuated to operate the by-pass valve 32 and release pressure in the hydraulic lines by an accelerometer 37, which is a device capable of sensing both linear and angular decelerations. The accelerometer is connected to an actuating lever 38 which is shown as pivoted on a fixed support at 39, and connected to actuate the switch 34.

The accelerometer 37 measures and automatically compares linear and angular deceleration, and when the ratio of angular deceleration to linear deceleration exceeds a predetermined quantity, the switch 34 is actuated to release the hydraulic pressure. As will be appreciated by those skilled in the art, this may be accomplished by a direct mechanical connection, rather than an electrical connection to the valve 32.

As illustrated particularly in the detailed illustrations of FIGURES 2 and 3, the accelerometer 37 includes a control flywheel 40 mounted for rotation with a support shaft 44. The support shaft is rotatably mounted in support bearings to extend coaxially within the flywheel 40 and to extend axially in a direction parallel to the movement of the vehicle 6. The support shaft 44 is driven at a speed which is a function of the speed of preselected wheels of the vehicle, and in the preferred embodiment, is driven as a function of the mean speed of the rear wheels 12 and 13 of the vehicle.

Mounted on the control shaft 44 is a drive sprocket 41, driven by a drive chain 42, which in turn is driven by a sprocket 43, mounted on the propeller or drive shaft 16 of the vehicle.

In modern automotive vehicles, weight distribution and braking effort distribution is such that the rear wheels lock before the front wheels. Therefore, sensing the deceleration of the rear wheels will normally sense an overapplication of brake force, and a tendency to lock the wheels. As the rear wheels are interconnected to the drive shaft, the drive shaft follows their speed and deceleration, and rotates at a function of the mean speed of the wheels. If one of the rear wheels lock, the other keeps rolling, the speed of the drive shaft 16 will be halved. However, because of the reduction in drive ratio between the shaft and rear wheels, the actual changes in velocity will be much larger at the drive shaft than at the wheels. The present mechanism is capable of sensing this excess in deceleration of the drive shaft that will occur when one of the rear wheels locks, and, therefore, a single deceleration measuring device is capable of preventing excessive braking which will result in locking of either of the rear vehicle wheels.

The control flywheel 40 provides a control mass having an inertia, and the force of this inertia is utilized to measure the ratio between angular deceleration and linear deceleration. The control flywheel 40 is threaded to the shaft 44 which is driven in rotation in the direction indicated by the arrows 46 in FIGURES 2 and 3. The shaft is provided with female threads 47 receiving the male threads 48 on the interior of the cylindrical bore 49, extending through the center of the flywheel. The direction of the threads 47 and mating threads 48 is such that when the flywheel is turned in a forward direction, that is, in the direction of the arrow 46, relative to the support shaft (or in other words, ahead of the support shaft), it will move rearwardly on the support shaft 44 or in the direction opposite to the direction of vehicle travel which is indicated by the arrow 51.

Movement of the flywheel in a rearward direction on the support shaft 44 is resisted by a first spring 52 which surrounds the support shaft and which bottoms on a collar 53 secured to the support shaft by a pin 54. The other end of the coil compression spring 52 extends into a recess 56 in the control flywheel 40, and pushes against a washer 57, resting against an angular surface 58 in the recess 56 of the flywheel. The compression force of the spring 52 must be overcome before the flywheel can rotate so as to move rearwardly on the support shaft 44. The force of the first spring 52 is counterbalanced by a second coil compression spring 59, which is at the forward end of the flywheel 40. The spring 59 is a torsionally rigid spring and one end connects to the radial face 61 of the flywheel, and the other end is connected to a clutch plate 64. A first clutch plate 62 is secured to the shaft 44 by a pin 63, and frictionally engages the second clutch plate 64. These clutch plates drive the flywheel with the support shaft. When the angular deceleration of the shaft 44 and the flywheel ceases to be proportional to the linear deceleration, the inertia of the flywheel will cause it to rotate in a forward direction with respect to the support shaft 44 against the spring 52, permitting the opposing spring 59 to expand as the flywheel 40 moves linearly rearwardly.

The actuator lever 38 is forked at its end with branches 38a and 38b being arcuately shaped to rest in an annular groove 66 in the control flywheel. Therefore, linear movement of the flywheel along the control shaft will pivot the lever 38 to actuate the switch 34, as illustrated in FIGURE 1.

In operation, the vehicle will move linearly in the direction of the arrow 51, and will decelerate as a braking force is applied which creates a hydraulic pressure in the hydraulic lines 26, 23 and 24 to operate the individual brakes 18, 19, 21 and 22. The control mass or flywheel 40 has an inertia which tends to carry it in a forward direction. The angular deceleration of the vehicle is also transmitted to the flywheel which tends to force it in a rearward direction maintaining the flywheel in a fixed linear position relative to the support shaft 44 as long as the rotational deceleration remains proportional to the linear deceleration or at less than a predetermined ratio thereto. Rotational deceleration is transmitted to the flywheel as a function of the mean deceleration of the rear wheels 12 and 13 by driving the support shaft 44 from the vehicle drive shaft 16. With locking of one of the rear wheels, the speed of the drive shaft will suddenly be halved, and the inertia of the flywheel will cause it to rotate in a forward rotational direction relative to the support shaft, and thereby move linearly rearwardly because of its threaded relationship to the shaft. This will pivot the actuating lever 38, actuating switch 34, and operate the by-pass valve 32 to relieve the pressure on the hydraulic lines to the brakes, thus reducing the braking effort and automatically releasing the skidding rear wheels.

As will be recognized in some embodiments, it may be preferred to connect the brake release valve to release only the rear wheel brakes, rather than all of the brakes of the vehicle.

When a solenoid valve is used to release the hydraulic fluid, it is possible to incorporate a vibrator in the circuit to make sure that malfunctioning of the device does not keep the brakes off continuously.

Thus it will be seen that I have provided an improved brake control mechanism or anti-skid device which meets the objectives and advantages hereinbefore set forth. The mechanism is reliable in operation and employs elements of construction which are capable of a long operating life and of reliable continued functioning without adjustment or attention. The mechanism is free of complicated mechanism requiring accurate adjustment and manufacturing tolerances, and is relatively inexpensive to manufacture. Furthermore, the mechanism can readily be attached and adapted to existing vehicle designs without major cost in revision or reconstruction.

I have, in the drawings and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. In combination, a vehicle having front wheels and rear wheels, a differential gearing drivingly connected to the rear wheels, an engine for driving the vehicle, a drive shaft connected between the engine and said differential gearing, braking means for each of the wheels, operating means connected to the braking means for simultaneously applying said braking means for restraining movement of the vehicle, a braking control connected to said operating means for controllably releasing said braking means, a control flywheel mounted for free rotation and free linear movement with the vehicle, a support shaft extending coaxially to the flywheel and supporting the flywheel for rotational and linear movement thereon, said support shaft being rotatably supported on the vehicle with its axis extending in the direction of vehicle movement, screw threads between the flywheel and support shaft extending in the direction to move the flywheel linearly rearwardly on the suport shaft when the flywheel is rotated forwardly in a rotational direction relative to the support shaft, drive means connected between the support shaft and vehicle drive shaft for driving the support shaft in said forward rotational direction at a function of the mean speed of the rear wheels of the vehicle when said vehicle moves in a forward linear direction, a first coil compression spring mounted on the drive shaft rearwardly of the flywheel and uring the flywheel in a forward direction relative to the support shaft, a second coil compression spring at the forward end of the flywheel urging the flywheel in a rearward direction and being torsionally rigid, a first clutch plate mounted on the drive shaft forwardly of the flywheel, a second clutch plate connected to said second spring and in engagement with said first clutch plate to rotatably drive the flywheel and provide a linear backing for said second spring, and an actuator connected to said braking control and connected to said flywheel for operating said braking control when said flywheel moves linearly rearwardly on said support shaft when the support shaft is rotatably decelerated relative to its linear deceleration at a rate greater than a predetermined ratio.

2. In a power driven motor vehicle having front and rear supporting wheels and an engine, the combination comprising a differential gearing connected to drive the rear wheels, a drive shaft connected between the engine and said differential gearing, a braking means connected to at least one of the wheels of the vehicle, operating means connected to said braking means for applying a force thereto, a braking control connected to said operating means for releasing said braking means, a rate comparing means responsive to linear and rotary deceleration and carried on the vehicle and being connected to said braking control for releasing the braking means when the rotary deceleration is in excess of a predetermined relationship to the linear deceleration, and a rotary drive means connected between said rate comparing means and said drive shaft for driving the comparing means at a speed which is a function of the mean speed of the rear wheels.

3. In a power driven motor vehicle having front and rear supporting wheels and an engine, the combination comprising a differential gearing connected to drive the rear wheels, a drive shaft connected between the engine and said differential gearing, individual braking means for each of the vehicle wheels, operating means connected to said braking means for simultaneously applying said braking means for restraining movement of the vehicle, a braking control connected to said operating means for controllably releasing said braking means, rate comparing means responsive to linear and rotary deceleration carried on the vehicle and being connected to said braking control for releasing the braking means when the rotary deceleration is in excess of a predetermined ratio to the linear deceleration, and rotary driving means connected between said rate comparing means and said drive shaft for driving the comparing means at a speed which is a function of mean speed of the rear wheels.

4. A mechanism responsive to a predetermined maximum rotary deceleration relative to a linear deceleration for controlling the application of the braking force to a vehicle wheel or the like which comprises a control flywheel rotating in a forward direction when the vehicle moves linearly forwardly, said flywheel rotating at a speed which is a function of the speed of a vehicle wheel to be controlled and to be carried at the forward linear speed of the vehicle, a support shaft extending coaxially through the flywheel to be rotatably mounted with its axis extending parallel to the linear direction of travel of the vehicle, screw thread means connecting said flywheel to said support shaft and moving the flywheel in a linear rearward direction along the shaft with rotation of the flywheel relative to the support shaft in said forward rotational direction, a first coil compression spring connected to the shaft and engaging the rear end of the flywheel urging it in the forward linear direction relative to the support shaft, a second coil compression spring engaging the forward end of the flywheel and urging it in a rearward linear direction with respect to the shaft, a friction clutch plate mounted on the shaft forward of the flywheel, a coacting friction clutch plate connected to said second spring and frictionally engaging and supportingly engaging said clutch plate attached to the shaft, and actuating means connected to the flywheel and being moved in a reverse linear direction relative to the shaft when the shaft is decelerated rotationally and linearly with the rotational deceleration rate exceeding a predetermined ratio relative to the linear deceleration rate so that the inertia of the flywheel unbalances said springs and drives the flywheel rotationally forwardly relative to the support shaft and the flywheel moves linearly rearwardly on the support shaft along the screw threads.

5. In combination in a braking system for a motor vehicle having front and rear wheels, braking means for each of said wheels, hydraulic actuators for each of said braking means, a manually operated hydraulic pump, and conduits leading from said pump to each of said actuators, by-pass valve means connected to said lines to simultaneously relieve the pressure to all of said actuators, a differential gearing drivingly connected to the rear wheels of the vehicle, a drive shaft drivingly connected to said differential gearing, a rate comparing means responsive to linear and rotary deceleration mounted on the vehicle, a valve actuator connected to said by-pass valve and connected to said rate comparing means and operated to open said by-pass valve and release the force applied to the wheels by said braking means when the rotational deceleration of said rate comparing means exceeds a predetermined ratio to a linear deceleration thereof, and driving means connected to said drive shaft and connected to said rate comparing means to drive the rate comparing means at a function of the mean speed of said rear wheels.

6. In a braking system for a vehicle having a plurality of wheels, a differential gearing connected to drive wheels on opposite sides of the vehicle, individual braking means for each of the vehicle wheels, operating means connected to said braking means for simultaneously applying said braking means for restraining movement of the vehicle, a braking control connected to said operating means for controllably releasing said braking means, rate comparing means responsive to linear and rotary deceleration to be carried on the vehicle and being connected to said braking control for releasing the braking means when the rotary deceleration is in excess of a predetermined relationship to the linear deceleration, and a rotary drive shaft connected to said rate comparing means and connected to said differential gears to be rotated at a speed which is a function of the mean speed of the wheels connected to the differential.

7. In a braking system for a vehicle having a plurality of wheels, a differential gearing connected to driven wheels on opposite sides of the vehicle, a braking means connected to brake at least one of the driven wheels of the vehicle, operating means connected to said braking means for applying a movement restraining force to the wheel and vehicle, a braking control connected to said operating means for releasing said braking means, a support shaft means connected to rotate at the drive speed of the differential gearing, a control flywheel to be freely rotatable on the support shaft means at a speed which is a function of the mean speed of rotation of said driven wheels and to be carried linearly at the forward speed of the vehicle, screw thread means between said support shaft means and said control flywheel extending in a direction to move the flywheel in a rearward linear direction relative to the support shaft means when the flywheel is rotated forwardly relative to the support shaft means, means biasing the flywheel linearly forwardly relative to the support shaft means, and actuating means connected to the flywheel and moved linearly rearwardly when the support shaft means is decelerated rotationally relative to the linear deceleration of the vehicle at a rate which exceeds a predetermined ratio so that the flywheel moves linearly rearwardly on the support shaft means, said actuating means connected to said braking control to release the braking means when said flywheel moves linearly rearwardly.

References Cited in the file of this patent

UNITED STATES PATENTS

| | | |
|---|---|---|
| 2,012,366 | Wevers | Aug. 27, 1935 |
| 2,892,660 | Reswick et al. | June 30, 1959 |
| 2,933,161 | Hebberling et al. | Apr. 19, 1960 |